US008712569B2

(12) United States Patent
Goh et al.

(10) Patent No.: US 8,712,569 B2
(45) Date of Patent: Apr. 29, 2014

(54) SYSTEM FOR DETERMINING POTENTIAL LOT CONSOLIDATION DURING MANUFACTURING

(75) Inventors: Jimmy Lay Kuan Goh, Singapore (SG); Meng Yong Quek, Singapore (SG); Siow Ling Kong, Singapore (SG)

(73) Assignee: GLOBALFOUNDRIES Singapore Pte. Ltd., Singapore (SG)

( * ) Notice: Subject to any disclaimer, the term of this patent is extended or adjusted under 35 U.S.C. 154(b) by 726 days.

(21) Appl. No.: 12/147,489

(22) Filed: Jun. 27, 2008

(65) Prior Publication Data
US 2009/0326996 A1  Dec. 31, 2009

(51) Int. Cl.
*G06F 19/00* (2011.01)

(52) U.S. Cl.
USPC .............................................. 700/110; 438/14

(58) Field of Classification Search
USPC .................... 700/110, 112, 121; 438/14
See application file for complete search history.

(56) References Cited

U.S. PATENT DOCUMENTS

| | | | | |
|---|---|---|---|---|
| 5,014,208 A | * | 5/1991 | Wolfson | 700/99 |
| 5,841,677 A | * | 11/1998 | Yang et al. | 702/176 |
| 6,303,398 B1 | * | 10/2001 | Goerigk | 438/14 |
| 6,584,369 B2 | * | 6/2003 | Patel et al. | 700/100 |
| 6,643,558 B2 | * | 11/2003 | Huber et al. | 700/112 |
| 6,654,655 B1 | * | 11/2003 | Chuang et al. | 700/100 |
| 6,730,604 B1 | * | 5/2004 | Liu et al. | 438/694 |
| 6,799,311 B1 | * | 9/2004 | Ryskoski | 700/110 |
| 6,931,295 B2 | * | 8/2005 | Lin et al. | 700/100 |
| 7,003,368 B2 | * | 2/2006 | Koike et al. | 700/121 |
| 7,142,937 B1 | * | 11/2006 | Chin et al. | 700/99 |
| 7,487,002 B2 | * | 2/2009 | Schmidt | 700/112 |
| 7,567,851 B2 | * | 7/2009 | Schmidt | 700/103 |
| 7,571,019 B2 | * | 8/2009 | Winstead et al. | 700/100 |
| 7,603,195 B2 | * | 10/2009 | Puri et al. | 700/112 |
| 7,679,715 B2 | * | 3/2010 | Kruijswijk et al. | 355/27 |
| 7,711,445 B2 | * | 5/2010 | Rice et al. | 700/101 |
| 7,890,202 B2 | * | 2/2011 | Arndt et al. | 700/112 |
| 7,974,726 B2 | * | 7/2011 | Rothe et al. | 700/112 |
| 8,002,511 B2 | * | 8/2011 | Kamikawa et al. | 414/416.02 |
| 8,369,975 B2 | * | 2/2013 | Pettus et al. | 700/105 |
| 2002/0178074 A1 | * | 11/2002 | Bloom | 705/26 |
| 2003/0171972 A1 | * | 9/2003 | Heskin | 705/9 |
| 2004/0001619 A1 | * | 1/2004 | Tai et al. | 382/141 |
| 2004/0172344 A1 | * | 9/2004 | Stockwell et al. | 705/28 |
| 2005/0096782 A1 | | 5/2005 | Chen et al. | |
| 2006/0074522 A1 | * | 4/2006 | Liang et al. | 700/223 |
| 2006/0142887 A1 | * | 6/2006 | Huang et al. | 700/100 |
| 2007/0142954 A1 | * | 6/2007 | Wu et al. | 700/116 |
| 2007/0156272 A1 | * | 7/2007 | Winstead et al. | 700/97 |
| 2008/0009959 A1 | * | 1/2008 | Enright et al. | 700/96 |

OTHER PUBLICATIONS

Pillai, "The Future of Semiconductor Manufacturing, an article on factory integration" (Dec. 2006) IEEE Robotics & Automation Magazine, p. 16-24.*

(Continued)

*Primary Examiner* — Kidest Bahta
(74) *Attorney, Agent, or Firm* — Horizon IP Pte Ltd (57) ABSTRACT

A system for determining a list of potential lots for consolidation is presented. The system includes a module having a database and an input for receiving an event occurrence. The database may include a set of consolidation rules. The module, upon receiving the event occurrence, retrieves the consolidation rules and initiates a consolidation analysis to determine the list of potential lots for consolidation based on the consolidation rules.

25 Claims, 6 Drawing Sheets

(56) References Cited

OTHER PUBLICATIONS

Lee "Lot Sizing to Reduce Capacity Utilization in a Production Process with Defective Items, Process Corrections, and Rework" (1992) Management Science, vol. 38, No. 9, pp. 1314-1328.*

Huang et al. "Lot Dispatching and Scheduling Integrating OHT Traffic Information in the 300mm Wafer Fab" (2007) Proceedings of the 3rd Annual IEEE Conference on Automation Science and Engineering, p. 495-5000.*

P. Qu and S. J. Mason. 2005. Metaheuristic Scheduling of 300mm Lots Containing Multiple Orders. IEEE Transactions on Semiconductor Manufacturing, vol. 18, No. 4, pp. 633-643.*

* cited by examiner

SYSTEM FOR DETERMINING POTENTIAL LOT CONSOLIDATION DURING MANUFACTURING

BACKGROUND

Manufacturing of integrated circuits (ICs) typically involves performing numerous processes on a wafer. For example, the processes can include polishing, deposition, photolithography, etching, cleaning, heat treatment as well as other processes. These processes are generally performed on different processing tools. In addition, different products may require different set of processes or recipes. It is not uncommon for a wafer to pass through over 400 processing steps during manufacturing.

The wafers are processed in lots. A container such as a cassette stores one or more lot(s) of wafers. Conventional cassettes store up to 25 wafers. A cassette is loaded into a carrier, such as standard mechanical interface (SMIF) or front opening unified pod (FOUP) for transport throughout the factory. One or more production lots are carried by a carrier to undergo a fabrication task. When a production lot is introduced into the production line, it is usually associated with a carrier. During processing, wafers can be dropped off due to, for example, exceptions encountered in the line. The dropped-off wafers are subsequently scrapped.

Improved handling of lots in a manufacturing process is desirable to increase production efficiency and throughput.

SUMMARY

A system for determining a list of potential lots for consolidation is provided. The system comprises a module having a database and an input for receiving an event occurrence. The database may include a set of consolidation rules. The module, upon receiving the event occurrence, retrieves the consolidation rules and initiates a consolidation analysis to determine a list of potential lots for consolidation based on the consolidation rules.

In another aspect of the invention, a method for determining a list of potential lots for consolidation is presented. The method includes providing a module having database and an input for receiving an event occurrence. The method further includes providing a set of consolidation rules within the database. The module, upon receiving the event occurrence from the input, retrieves the set of consolidation rules and initiates a consolidation analysis to determine the potential lot list for consolidation based on the consolidation rules.

A consolidation system module comprises a first input for receiving an event of a change in content of a first lot having an initial content is provided. The consolidation system further includes a set of consolidation rules. The consolidation rules determines potential lots that can be consolidated upon detecting a change in the first lot content from the first input. The potential lots each having a content smaller than the initial content. The consolidation system includes a first output sending a request for holding (at the consolidation step) the first lot and one or more potential lots after the potential lots have been determined from the set of consolidation rules. The system further includes a second input for detecting readiness of one or more potential lots for consolidation (the lots are ready for consolidation when they reach the consolidation step) after the request from the first output have been sent and a second output. The second output sends a command to consolidate the first lot and one or more potential lots into one carrier after the readiness of one or more potential lots for consolidation has been detected by the second input.

These and other objects, along with advantages and feature of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. Various embodiments of the present invention are described with reference to the following drawings, in which.

DESCRIPTION

In the following description, details are set forth such as specific materials, parameters, etc. in order to provide a thorough understanding of the present invention. It will be evident, however, that the present invention may be practised without these details. In other instances, well-known process steps, equipment, etc. have not been described in particular detail so as not to obscure the present invention.

Figure 1:
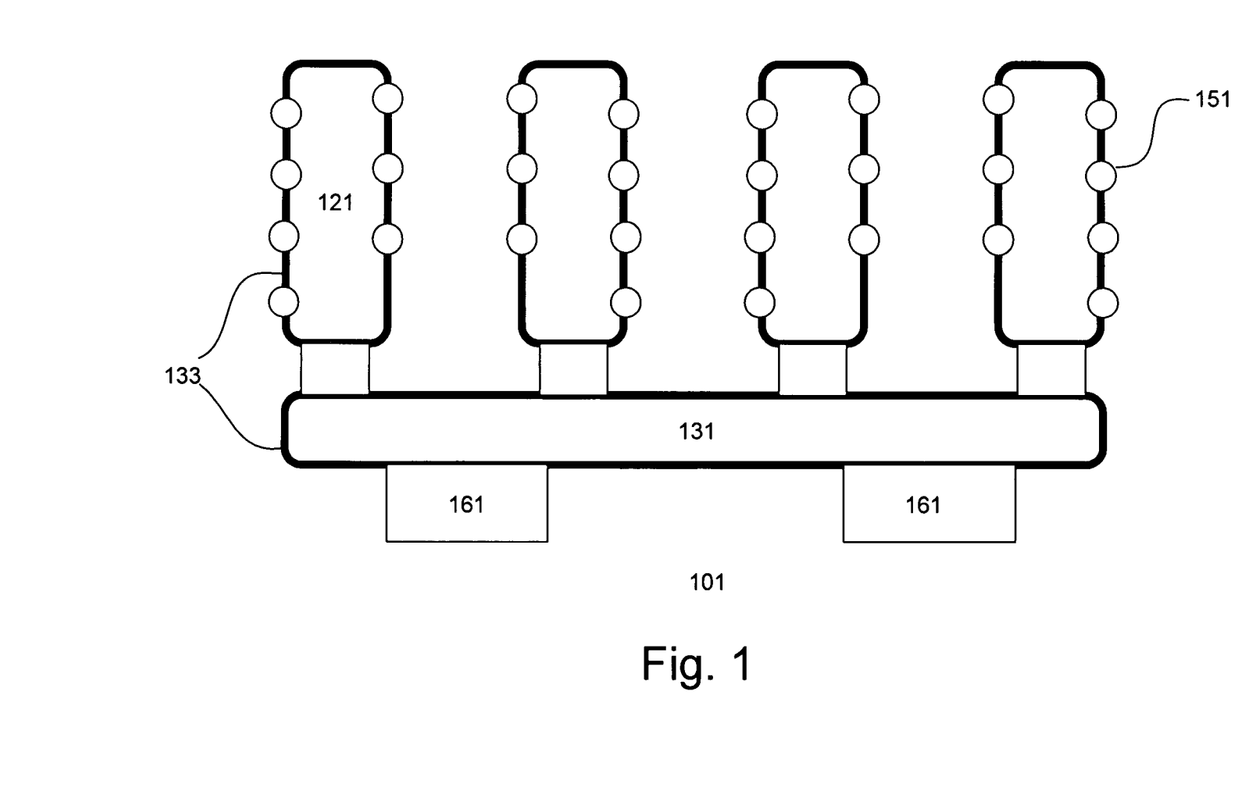
FIG. 1 shows a layout of a production facility in accordance with one embodiment of the invention.

FIG. 1 shows a layout 101 of a production facility in accordance with one embodiment of the invention. The factory layout, for example, is employed to process semiconductor wafers to form integrated circuits. The factory layout can also be used to process other types of products, such as LCD panels. As shown, the factory layout comprises a plurality of bays 121 and stockers 161. The bays and the stockers, for example, are located on opposite sides of a main bay or central isle 131. Tools 151 are arranged in a loop within a bay.

A transport system, such as an automated materials handling system (AMHS) is provided for the main bay and bays. The AMHS, in the embodiment, comprises an overhead transport (OHT) system. The overhead transport system includes tracks 133 in which transport vehicles travel. Other types of transport systems, such as overhead shuttle (OHS), are also useful, alone or in combination. The transport vehicles can travel within the same bay (intra-bay) or between different bays (inter-bay). A loop may, for example, contain multiple vehicles which travel in one direction. Other configurations, such as bi-directional travel within a loop, can also be useful. Transport vehicles facilitate intra-bay or inter-bay transfer of wafers contained in a carrier. Various types of carriers, such as front opening unified pods (FOUPs), cassettes or standard mechanical interface (SMIF) pods, can be used.

Wafers are grouped into lots. The maximum number per lot (lot size), for example, is 25 wafers. Providing lot sizes with other maximum number of wafers is also useful. When a lot is first introduced into the production process, it can have the maximum number of wafers per lot. In one embodiment, a lot is associated with the same carrier during the process until change event. The change event, in one embodiment, comprises consolidation of two or more lots into a carrier. As such, a carrier can comprise two or more lots, so long as the total number of wafers is less than or equal to the carrier capacity. For example, in the case which a carrier can contain a maximum of 25 wafers, two or more lots can be combined if the total number of wafers of the combined lots is less than or equal to 25. Wafers are moved from one carrier to another using a sorter equipment. A stocker can be provided for temporary storage of carriers. It can be located between two adjacent bays for sharing therebetween. Other production layout configurations are also useful.

A manufacturing automation system facilitates automation in the production facility. The automation system controls the execution of the tools to process the wafers and movement of the wafers. The automation system can include different systems which interact to control various aspects of the production facility.

Figure 2:
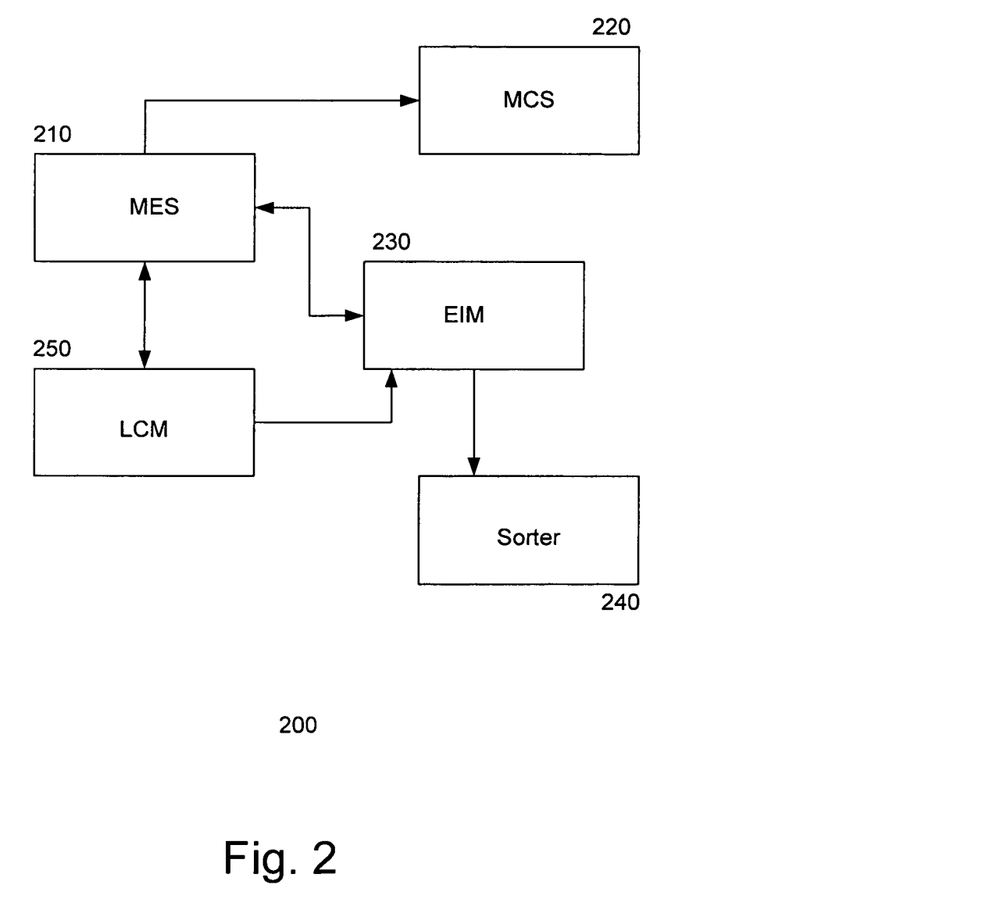
FIG. 2 shows a block diagram of an automation system in accordance with one embodiment of the invention.

FIG. 2 shows an automation system (AS) 200 in accordance with one embodiment of the invention. The AS includes a manufacturing execution system (MES) 210. In one embodiment, the MES comprises a computer program (e.g. SiView MES from IBM) residing in a host computer. Other types of MESs are also useful. In one embodiment, the MES tracks the overall execution of operations in the production facility. Functions of the MES may include, for example, tracking the location of carriers and status of equipment as well as performing lot reservations and putting lots on hold. Other functions associated with the production facility can also be performed by the MES. The MES can store various types of information. For example, detailed and up-to-date information of all lots (production and non-production) can be stored in the MES. Lot information includes, for example, the lot ID, quantity of wafers, wafer IDs, lot priority, product ID, process flow, recipes and the current step in the process flow. The MES can also store up-to-date information of the content map of each carrier. The content map includes, for example, lot identification numbers (IDs) in the carrier, wafer IDs and slot location within the cassette holding of each wafer. Other types of information may also be included in the content map.

The AS also includes a material control system (MCS) 220. The MCS controls or manages the wafer carriers. For example, the MCS initiates and coordinates concurrent movement of wafer carriers within the AMHS. This may also include coordinating inter-bay and intra-bay system activities between production equipment load ports and stockers. Real time status and monitoring of inter-bay and intra-bay AMHS components are maintained by the MCS, including an inventory database of wafer carrier locations within the AMHS. To track locations of wafer carriers, the MCS interfaces with an identification system which includes carrier ID readers at key entry and exit points within the AMHS.

The MCS also interfaces with a transport system controller (not shown). The transport system controller (TSC) maintains the operation of the AMHS, such as the OHTs and stockers. Other types of transport systems are also useful. The MCS instructs the TSC to facilitate movement of the lots to their destinations as designated by, for example, dispatch rules and priorities of the MES. The MCS can also provide reports on lot movements and locations, lot inventory summaries, non-product inventories and data on AMHS reliability.

The AS further includes one or more wafer sorters 240. Various types of wafer sorters can be employed. The sorter may include a plurality of load ports for receiving the wafer carriers for processing. Processing includes, for example, lot verification, lot creation, physically splitting a lot or physical merging of lots. An equipment integration manager (EIM) 230 is provided to control the operations of the sorter. The EIM interfaces with the MES and wafer sorter. For example, processing instructions are received from the MES. Once processing is completed, lot information updates, if necessary, are transmitted to the MES.

In accordance with one embodiment, a lot consolidation manager (LCM) 250 is provided. The LCM comprises, for example, a computer program residing in a host computer system. In one embodiment, the LCM comprises a software module of the AS. It can further include a memory which contains the consolidation rules. In one embodiment, the LCM interfaces with the MES and EIM, and may function to determine potential lots for consolidation during manufacturing process.

Figure 3:
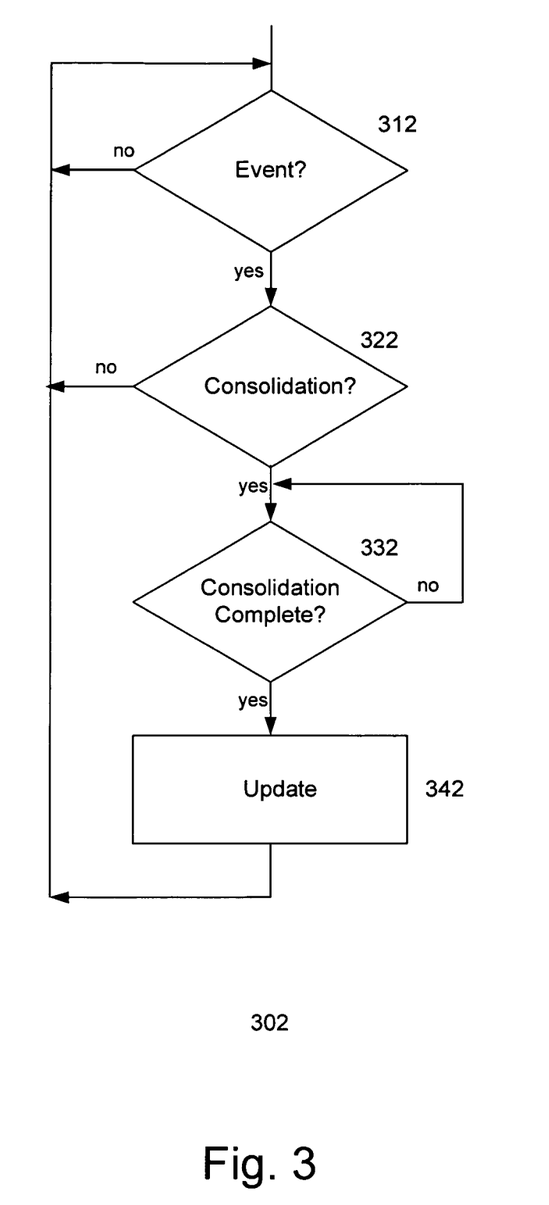
FIG. 3 shows a process flow of a Consolidation Manager in accordance with one embodiment of the invention.

FIG. 3 shows a flow diagram 302 of an LCM in accordance with one embodiment. The LCM, upon occurrence of an event at step 312, initiates a consolidation analysis at step 322. The event comprises, in one embodiment, a FOUP content map change event. This occurs when a lot has been altered (e.g., wafers being scrapped) during the manufacturing process. The consolidation analysis includes retrieving FOUP and lot information from the MES. The lot information is, for example, contained in a content map stored in the MES. The content map of the FOUP includes information of the lots in the FOUP, wafer IDs and the slot where each wafer is residing. Lot information may contain detailed information such as lot ID, lot size, wafer IDs, priority, product ID, process flow, recipes and stage of production. Other types of information may also be included in the content map.

The LCM also retrieves a set of consolidation rules from its database. The consolidation rules define the basis for which lots can be consolidated. Generally, the consolidation rules can be defined as desired and may depend on business requirements. The consolidation rules may be defined using a graphical user interface (GUI). Other ways of defining the consolidation rules are also useful. The consolidation rules can be based on same or similar product IDs, lot size, lot priority, proximity of lots within process flow, impact on lots' cycle time, or a combination thereof. Other types of consolidation rules are also useful.

Lots of the same products can easily be consolidated since they go through the same process steps. Lots of similar products, such as products within a product group, may also be potential consolidation candidates if they go through substantially the same or similar process flow or if the remaining process steps are substantially similar or the same. Lot size determines whether lots can be potentially combined. If the lot size of the combined lots exceeds the maximum capacity of the FOUP, the lots cannot be combined. The maximum capacity of the FOUP is, for example, 25 wafers. Other maximum capacities are also useful. With respect to rules based on lot priority, certain types of priority lots should not be consolidated. For example, "bullet lots" or "prototype lots" should not be consolidated since these lots are designed to have small lot size with the objective of short cycle time. Preferably, the priorities of the consolidation candidates should be about the same. The proximity of lots within the process flow refers to how many steps (plus or minus) are between potential lots. Preferably, potential lots should be fairly close in the process flow to each other. For example, potential lots should be within about 10% of the total number of processing steps in the process flow. Impact of lots' cycle time refers to when two or more lots are combined; they should still be able to meet customer-required delivery dates. If not, the lots should not be consolidated. Additionally, rework lots can be potential consolidation candidates. For example, re-work lots at lithography can be combined to strip resist.

In general, the decision to consolidate the lots is based on real time status along the production line, such as the work-in-process (WIP) profile, cause of bottleneck, high level objectives and need at point-of-time, for example to optimize capacity or cycle time. Consolidation may be used primarily to enhance efficiency. As such, consolidation rules can be designed to be consistent with quality rules or customer requirements (e.g., required dates). An example of a quality rule may be a "Maximum Queue Time" rule, which limits the amount of time a lot spent between two processing steps. For example, after processing is completed at one step, the lot should reach the next step within certain time duration (e.g., 24 hours) to avoid adversely impacting the quality and/or yield of the wafers.

In one embodiment, the LCM retrieves from the MES a list of lots (lot IDs) having the same product ID or same product group. From this list, it identifies those lots which can be potentially consolidated with the lot(s) of the target FOUP. Potential lots are those lots which, when combined, will result in the consolidated lots to have a total number of wafers less than or equal to the maximum capacity of a FOUP, e.g., 25. Using the consolidation rules, the LCM determines the lot or lots which will be consolidated into the target FOUP. The LCM verifies that quality rules, customer requirements, and other consolidation rules, such as priority, are not violated. Based on the rules, the LCM also determines a consolidation step at which the lots will be consolidated.

If the analysis concludes that there are no potential lots to be consolidated, the LCM returns to step 312. On the other hand, if the analysis concludes that there are potential lots to be consolidated, the LCM issues transaction requests to the MES to put the potential lots on-hold at the consolidation step. When the lots reach the consolidation step, they are transferred to the sorter for consolidation at step 332. At step 332, the carriers containing the lots on-hold are transferred to the sorter until consolidation is completed. Once consolidation is completed, the content map is updated at step 342 and the held lots are released to continue processing. The LCM returns to step 312.

Figure 4:
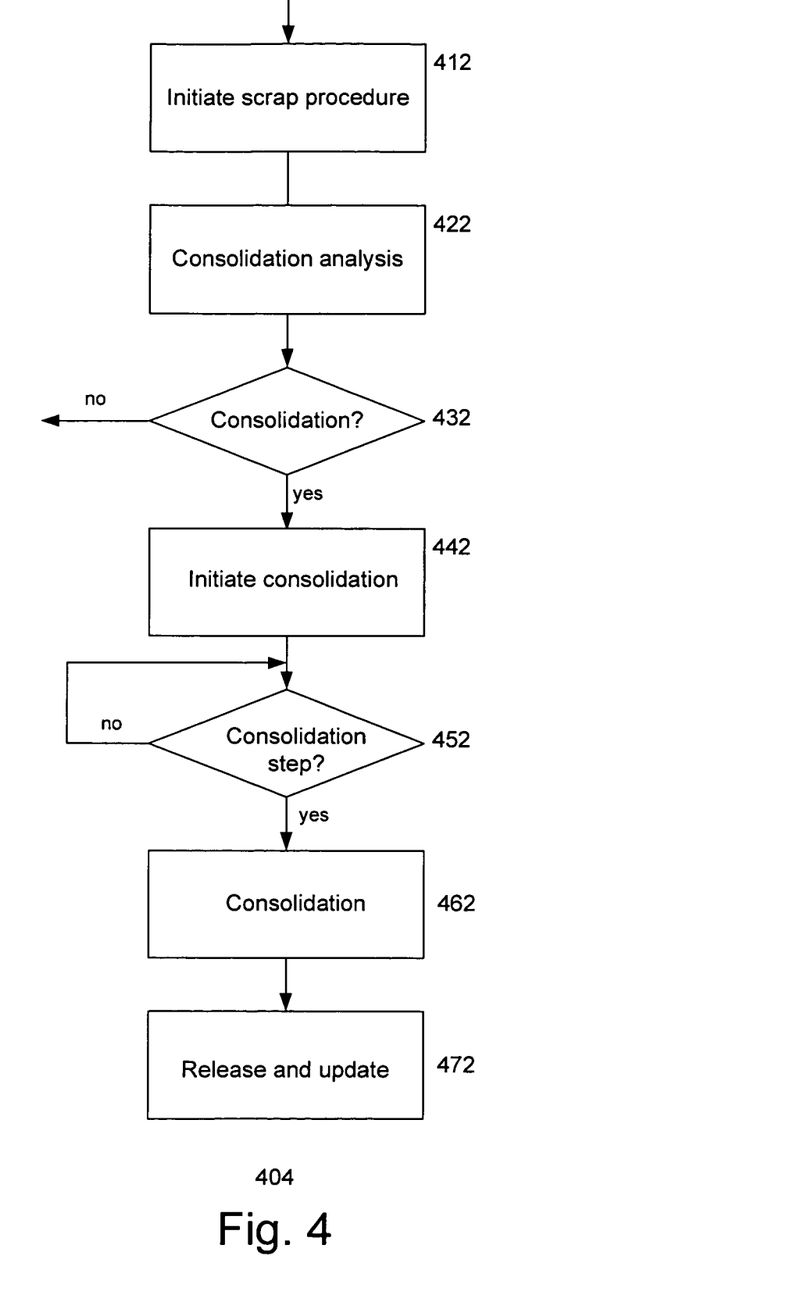
FIG. 4 shows a process flow for lot consolidation in accordance with one embodiment of the invention.

FIG. 4 shows a process flow 404 for consolidating lots in accordance with one embodiment. When wafers are to be scrapped, a user initiates a scrap procedure at step 412. The scrap procedure removes the bad wafers from the lot, leaving the good wafers remaining in the lot. Identification of defective wafers may be performed, for example, manually by the user. Other methods of identification are also useful. Defective wafers, for example, can be the result of 1) being damaged by equipment issues or mis-processing (e.g., over polish), 2) contamination from impurities or particles, or 3) having measurement results that are out of the customer specification.

In one embodiment, the scrap procedure is initiated by accessing the MES. For example, a user performs a logical split using the GUI interface of the MES. The lot is split into parent and child lots, with the scrap wafers being in the child lot and the good wafers in the parent lot. Although the lot is logically split into child and parent lots, physically both the child and parent lots are in the same carrier.

In one embodiment, the user manually carries the carrier to the sorter load port. A "read lot" operation is performed on the child lot using, for example, the GUI interface of the MES. The MES instructs the EIM to cause the sorter to read, for example, the markings on the wafers in the child lot. The markings, for example, can be T7 markings on the backside of the wafers. Other types of markings are also useful. Performing the read lot operation enables confirmation that the child lot contains the wafers to be scrapped.

A collector carrier is provided at another load port of the sorter manually. The user then scraps the child lot using the GUI interface of the MES. This results in the MES instructing the EIM to cause the sorter to move the bad wafers into the collector carrier. Once the bad wafers are removed, the EIM updates the content maps of the two carriers in the MES to reflect their contents, wherein one carrier is the original carrier containing the parent lot and the other carrier is the collector carrier containing the child lot. Other techniques for initiating and/or performing scrap procedures are also useful. For example, the carriers can be automatically provided at the sorter.

The updating of the content maps in the MES creates an event which causes the LCM to perform a consolidation analysis at step 422. To perform the consolidation analysis, the LCM retrieves the FOUP information and the lot information from the MES and reads the consolidation rules from its database. Information from the content maps is analyzed based on consolidation rules to identify potential lots (or candidate lots) to consolidate, as well as the process step at which consolidation is to occur (consolidation step). Consolidation can be performed for 2 or more lots, so long as the total number of wafers in the candidate lots does not exceed the carrier capacity. Preferably, the total number of wafers in the candidate lots should be equal to or near the maximum number (e.g., 25) of wafers per lot. The consolidation step can be at either the next processing step of the candidate lot that is further or furthest along the process flow (far lot) or a subsequent processing step. Preferably, the consolidation step should be selected to optimize cycle time of the candidate lots. For example, it may not be appropriate to consolidate at the next processing step of the far lot due to processing considerations.

At step 432, if the analysis concludes that no consolidation candidates are found, the LCM continues to listen for an event in the AS which will initiate the consolidation analysis. On the other hand, if the analysis concludes that the consolidation candidates are found, the far lot, near lot (i.e., a lot in an earlier stage processing than the far lot) and consolidation step are remembered in the LCM's database.

At step 442, the LCM initiates consolidation. Initiating consolidation, in one embodiment, includes requesting the MES to hold the far and near lots at the consolidation step. Holding the lots suspends processing, causing the lots to wait at the consolidation step when the lots reach the consolidation step. At step 452, the LCM waits for the lots to reach the consolidation step. Whichever lot reaches the consolidation step first will be put on hold until the other lots reach the consolidation step. Until the consolidation step is reached, a candidate lot is allowed to continue processing. Once a candidate lot has reached the consolidation step, it is held. The far lot reaches the consolidation step before the near lot. Instructing the MES to hold the candidate lots ensures that neither passes the consolidation step. The LCM monitors the movement of the candidate lots through the process flow. When all consolidation candidates (i.e. the lots on hold) have reached the consolidation step, the LCM initiates the consolidation process.

Consolidation commences at step 462. In one embodiment, consolidation includes the LCM instructing the MES to request the MCS to command the AMHS to deliver the carriers to the sorter. When the carriers reach the sorter, they are loaded into the load ports. The LCM instructs the EIM to cause the sorter to consolidate the candidate lots into one carrier (e.g., transfer wafers of one carrier into the other). At step 472, the LCM issues the transaction to the MES to release the consolidated lots once transfer is completed. Processing of the consolidated lots continue. Additionally, the EIM updates the content maps of the carriers to reflect the consolidation of the candidate lots.

In general, the decision to consolidate the lots is based on real time status along the production line, such as the work in process (WIP) profile, cause of bottleneck, high level objectives and need at point-of-time, for example to optimize capacity or cycle time. In one embodiment, the consolidation rules are designed such that they do not violate quality rules (e.g., "Maximum Queue Time" rule) or customer requirements.

There may be situations where consolidated lots may be subsequently physically split to child lots. This may be due to various process considerations, such as change in priority status of one of the consolidated lots or when the lot is placed on a rework process flow.

Figure 5:
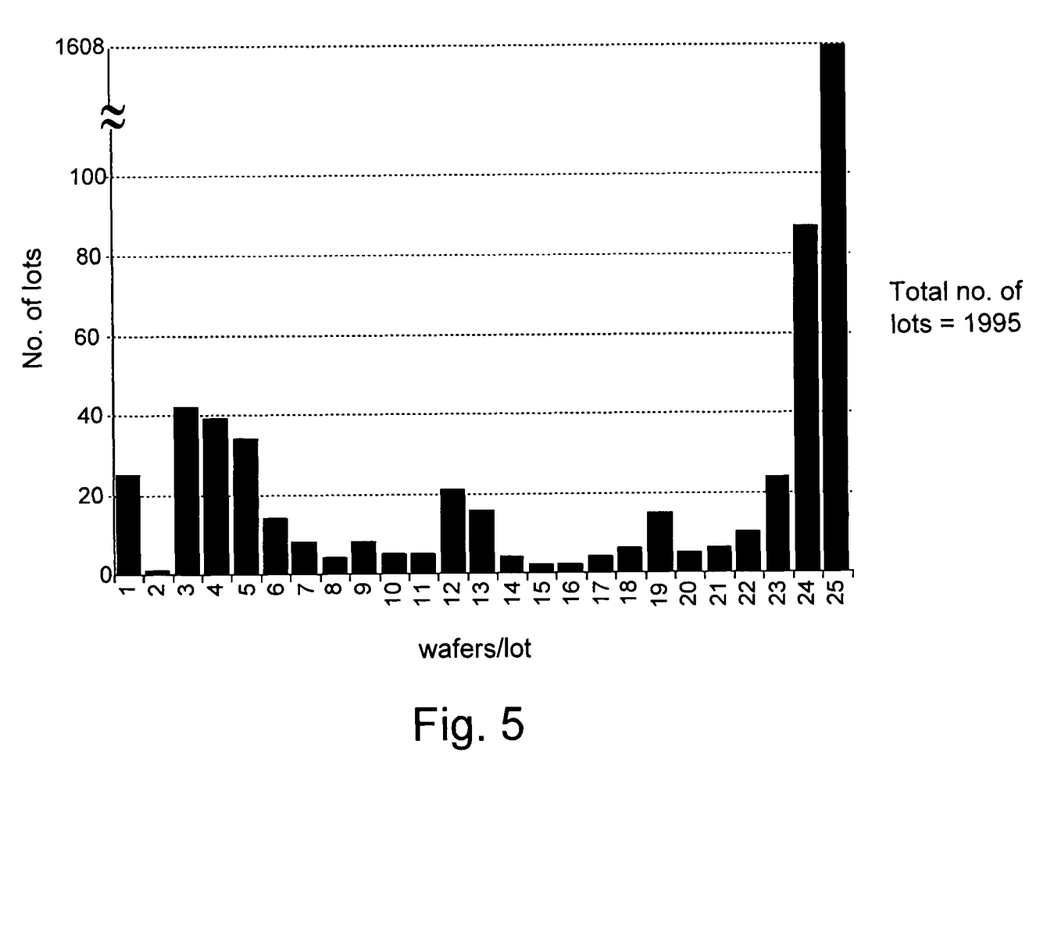
FIGS. 5-6 show the distribution of lots passing through two steps in the process flow.
Figure 6:
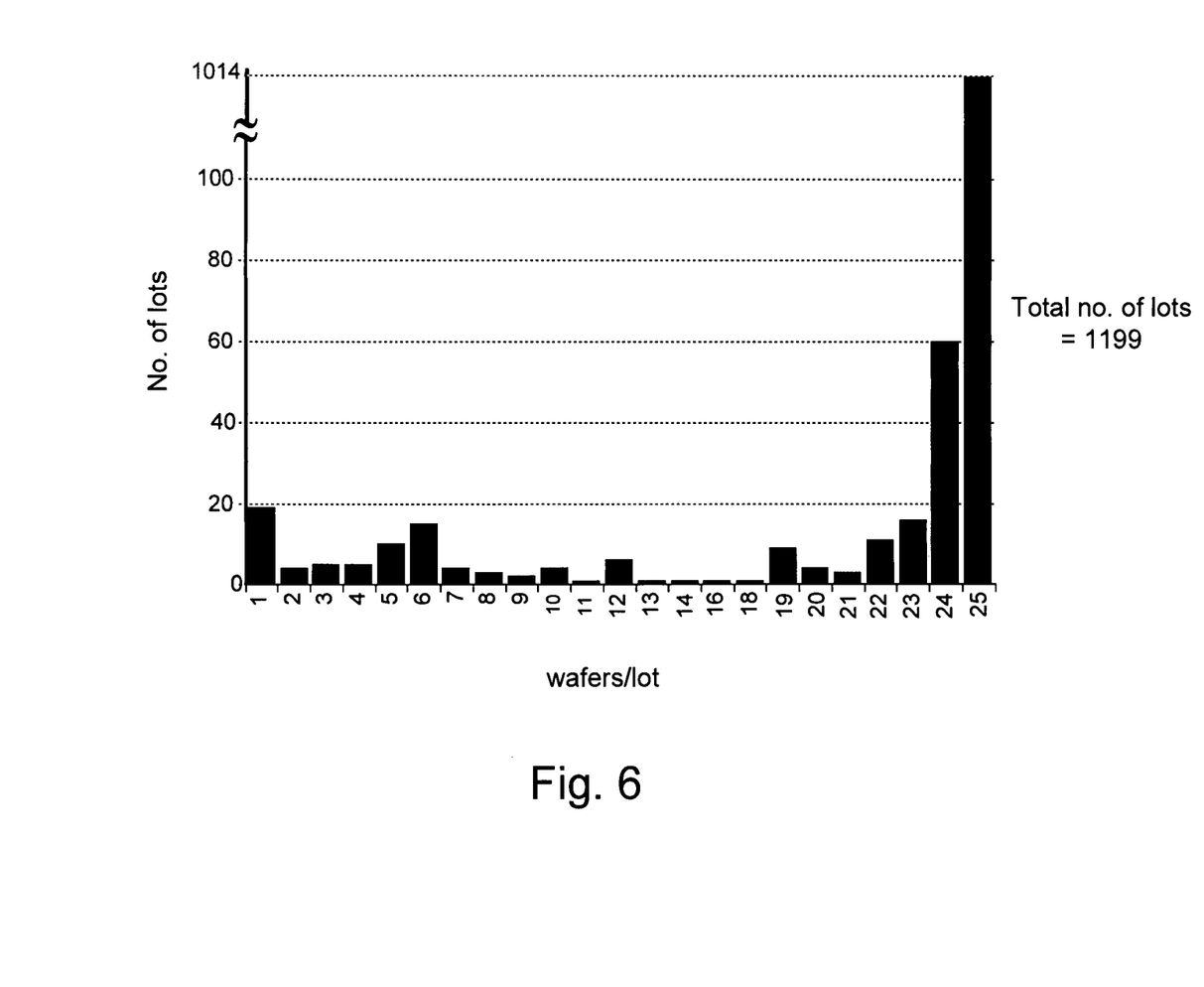

FIGS. 5-6 illustrate actual distribution of lots with different lot sizes. Referring to FIG. 5, a distribution of lots passing through EOXP tool is shown. The total sample size is 1995 lots. From the distribution, 1608 lots have the maximum number of wafers (25) while the remaining lots have less than 25 wafers. This shows that potentially 20% of the lots can be consolidated. FIG. 6 shows a distribution of lots passing through the LKAS/LKAL tool. The total sample size is 1199 lots, with 1014 having 25 wafers while the remaining lots have less than 25. This shows that potentially 15% of the lots can be consolidated. By consolidating lots, an increase utilization of tools or manufacturing resources is achieved.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A system comprising:
a lot consolidation manager (LCM) module for determining a list of potential lots for consolidation, the LCM module comprises a database and an input for receiving a triggering event, wherein
the triggering event comprises a reduction in the number of wafers in a first lot at any stage of processing, and
the database contains a set of consolidation rules for determining a list of potential lots for consolidation, the potential lots are contained in carriers,
wherein the LCM module, upon receiving the triggering event relating to the first lot at the input of the LCM module, retrieves the consolidation rules from the database of the LCM module, and initiates and performs a consolidation analysis to determine the list of potential lots for consolidation with the first lot based on the consolidation rules, wherein
the consolidation analysis determines a selected consolidation step for consolidation which can be at any stage of processing,
the first lot and the one or more lots from the list of potential lots for consolidation continue processing until reaching the selected consolidation step to form a single consolidated lot, and
the consolidation comprises physically merging wafers of the first lot with one or more lots from the list of potential lots for consolidation into a same carrier at the selected consolidation step for subsequent processing of the wafers.

2. The system of claim 1 wherein:
the determination of the selected consolidation step depends on the maximum allowed time a lot spends between two or more processing steps.

3. The system of claim 1 wherein the change in the number of wafers in a lot occurs when a wafer in a lot is scrapped.

4. The system of claim 1 wherein the potential lots for consolidation comprise lots belonging to similar products, wherein the lots belonging to similar products are products within a product group that go through substantially the same or similar process flow or if the remaining process steps are substantially similar or the same.

5. The system of claim 4 wherein the potential lots have a combined size of substantially equal to the maximum capacity of a carrier.

6. The system of claim 4 wherein the potential lots have similar or same priorities.

7. The system of claim 4 wherein the potential lots are fairly close within the process flow.

8. The system of claim 1 wherein the set of consolidation rules does not violate quality rules and/or customer requirements.

9. The system of claim 8 wherein the customer requirements comprise required delivery dates and the quality rules comprise limitation on the amount of time a lot spends between two processing steps.

10. A method for determining a list of potential lots of wafers for consolidation, the method comprising:
providing a host computer system having a lot consolidation manager (LCM) module comprising a database and an input for receiving a triggering event, wherein the triggering event comprises a reduction in the number of wafers in a first lot at any stage of processing; and
providing a set of consolidation rules within the database of the LCM module for determining a list of potential lots of wafers for consolidation,
wherein the LCM module, upon receiving the triggering event relating to the first lot at the input, performs the following steps comprising
retrieving the set of consolidation rules, and
initiating and performing a consolidation analysis to determine the potential lot list for consolidation with the first lot based on the consolidation rules, wherein
the consolidation analysis comprises determining a selected consolidation step for consolidation which can be at any stage of processing,
the first lot and the one or more lots from the potential lot list for consolidation
continue processing until reaching the selected consolidation step to form a single consolidated lot, and
the consolidation comprises merging wafers of the first lot with one or more lots from the potential lot list for consolidation into a same carrier at the selected consolidation step for subsequent processing of the wafers.

11. The method of claim 10 wherein the LCM module further performs of monitoring the potential lots for consolidation until the lots reach the selected consolidation step for consolidation.

12. The method of claim 10 wherein the change in the number of wafers in a lot occurs when a wafer in a lot is scrapped.

13. The method of claim 10 wherein the potential lots for consolidation comprise lots belonging to the same and/or similar products.

14. The method of claim 13 wherein the potential lots have a combined size of substantially equal to the maximum capacity of a carrier.

15. The method of claim 13 wherein the potential lots have similar or same priorities.

16. The method of claim 13 wherein the potential lots are fairly close within the process flow.

17. The method of claim 13 wherein the LCM module further performs the step of:
issuing a request to hold the lots to be consolidated which are determined from the potential lot list at the consolidation step until the consolidation is completed; and
issuing a transaction request to release the consolidated lot upon completion of the consolidation.

18. The method of claim 10 wherein the set of consolidation rules does not violate quality rules and/or customer requirements.

19. The method of claim 18 wherein the customer requirements comprise required delivery dates and the quality rules comprise limitation on the amount of time a lot spends between two processing steps.

20. The system of claim 1 wherein the input of the LCM module includes a first input and wherein the event occurrence includes an event of a change in content of a first lot having an initial content.

21. The system of claim 20 wherein the set of consolidation rules determine potential lots that can be consolidated upon detecting a change in the first lot content from the first input, the potential lots each having a content smaller than the initial content.

22. The system of claim 21 wherein the LCM module includes a first output sending a request for holding the first lot and one or more potential lots after the potential lots have been determined from the set of consolidation rules.

23. The system of claim 22 wherein the LCM module includes a second input for detecting readiness of one or more potential lots for consolidation after the request from the first output have been sent.

24. The system of claim 23 wherein the LCM module includes a second output, wherein the second output of the LCM module performs the step of sending a command to consolidate the first lot and one or more potential lots into one carrier after the readiness of one or more potential lots for consolidation has been detected by the second input.

25. A method of manufacturing an integrated circuit comprising:
providing two or more lots of wafers;
providing a host computer system having a lot consolidation manager (LCM) module for determining a list of potential lots for consolidation, the LCM module comprises a database and an input for receiving a triggering event, wherein the triggering event comprises a reduction in the number of wafers in a first lot at any stage of processing; and
determining a list of potential lots of wafers for consolidation by the LCM module upon receiving the triggering event relating to the first lot at the input, wherein the determining comprises,
providing a set of consolidation rules within the database of the LCM module,
retrieving the set of consolidation rules upon receiving the event occurrence relating to the first lot from the input,
initiating and performing a consolidation analysis by the LCM module to determine the list of potential lots for consolidation with the first lot based on the consolidation rules, wherein the consolidation analysis further determines a selected consolidation step for consolidation which can be at any stage of processing, and the first lot and the one or more lots from the list of potential lots continue processing until reaching the selected consolidation step to form a single consolidated lot; and
physically merging the wafers of the first lot with one or more lots from the list of potential lots for consolidation into a same carrier at the selected consolidation step based on the determined list for subsequent processing of the wafers.

* * * * *